(12) United States Patent
Wei et al.

(10) Patent No.: US 11,745,128 B2
(45) Date of Patent: Sep. 5, 2023

(54) WATER PURIFICATION FILTER ELEMENT AND HOUSEHOLD WATER PURIFIER

(71) Applicant: YUNDA H&H TECH (Tianjin) CO., LTD., Tianjin (CN)

(72) Inventors: Enyu Wei, Tianjin (CN); Hao Xu, Tianjin (CN); Yinping Yuan, Tianjin (CN)

(73) Assignee: Yunda H&H Tech (Tianjin) Co., Ltd.

( * ) Notice: Subject to any disclaimer, the term of this patent is extended or adjusted under 35 U.S.C. 154(b) by 49 days.

(21) Appl. No.: 17/515,394

(22) Filed: Oct. 29, 2021

(65) Prior Publication Data

US 2023/0033882 A1 Feb. 2, 2023

(51) Int. Cl.
| | |
|---|---|
| *B01D 35/30* | (2006.01) |
| *B01D 29/15* | (2006.01) |
| *B01D 29/56* | (2006.01) |
| *B01D 35/04* | (2006.01) |
| *B01D 35/153* | (2006.01) |
| *C02F 1/00* | (2023.01) |

(52) U.S. Cl.
CPC ........... *B01D 35/306* (2013.01); *B01D 29/15* (2013.01); *B01D 29/56* (2013.01); *B01D 35/04* (2013.01); *B01D 35/153* (2013.01); *C02F 1/003* (2013.01); *B01D 2201/287* (2013.01); *B01D 2201/298* (2013.01); *B01D 2201/304* (2013.01); *B01D 2201/305* (2013.01); *B01D 2201/4038* (2013.01)

(58) Field of Classification Search
CPC ...... B01D 35/306; B01D 29/15; B01D 29/56; B01D 35/04; B01D 35/153; B01D 2201/287; B01D 2201/298; B01D 2201/304; B01D 2201/305; B01D 2201/4038; B01D 29/114; B01D 29/90; B01D 2201/34; B01D 2311/2649; B01D 2313/18; B01D 2313/56; B01D 61/027; B01D 61/025; B01D 61/08; B01D 35/30; C02F 1/003; C02F 1/283; C02F 2307/10; C02F 1/441; C02F 1/444; C02F 2201/004; C02F 2201/006; C02F 2301/04; C02F 1/001; C02F 1/442; C02F 2201/002

See application file for complete search history.

(56) References Cited

FOREIGN PATENT DOCUMENTS

| CN | 109095563 A | * | 12/2018 | .............. A47J 31/00 |
| WO | WO-2006101364 A1 | * | 9/2006 | ............. B01D 35/30 |

* cited by examiner

*Primary Examiner* — Waqaas Ali
(74) *Attorney, Agent, or Firm* — Fishman Stewart PLLC

(57) ABSTRACT

A water purification filter element is provided. The water purification filter element may include a filter bottle, a filter material, an end cover, and a water self-stopping and passing structure.

13 Claims, 10 Drawing Sheets

WATER PURIFICATION FILTER ELEMENT AND HOUSEHOLD WATER PURIFIER

CROSS REFERENCE TO RELATED APPLICATION

This patent application claims the benefit of and priority to Chinese Patent Application No. CN 202110880457.6, filed on Aug. 2, 2021, the contents of which is hereby incorporated by reference in its entirety.

TECHNICAL FIELD

The present disclosure relates to the technical field of water purifiers, and particularly relates to a water purification filter element and a household water purifier.

BACKGROUND

At present, a filter element of a water purifier commonly used in the market is fixed in a rotary mode, and the purposes of mounting and fixing can be achieved only by screwing the filter element to rotate by a certain angle and be clamped into a specific part. However, due to the fact that the filter element is in a cylindrical shape, upon clamping the filter element into a machine, many users are hard to find a right position to clamp at first, and need to rotate the filter element by a plurality of turns to find the right position, and then further rotate the filter element to be clamped into a fixed hole position. Thus, the installation is complex.

In addition, when the filter element of the water purifier reaches the end of the service life and is disassembled, a large amount of water is left in the filter element, and the water in the filter element can flow out in the disassembling process, so that a large number of water stains are left in the water purifier, a cabinet, the ground and the like and are not easy to treat, even the water in the water purifier flows out to damage the water purifier, the cabinet or other furniture and household appliances, and thus the water purifier can not be friendly used.

In addition, water purifiers in the current market generally do not have a water quality detection function. When using the household water purifier, the user cannot visually know the water quality of water flowing into and out of the water purifier, cannot know whether the water purifier plays a role or not, and cannot know when the filter element should be replaced, so that the user needs to measure the water quality of the inlet water and the outlet water in daily use, and the user is also required to record the time life of the filter element.

Most importantly, most of the water purifier products on the market at present integrate a filter material of a water purification filter element with a filter bottle in order to achieve the purpose of specialization and convenience, the filter element and the filter bottle cannot be separated, when the filter material reaches the end of the service life, the user must discard the filter material of the filter element and the filter bottle completely. Such filter element is commonly called as an disposable filter element, which cause great waste of resources, and increase the use cost of the filter user.

Therefore, an existing water purifier and an existing water purification filter element need to be further improved and promoted.

SUMMARY

One of the purposes of the present embodiment is to provide a water purification filter element to solve the problems of resource waste and high use cost of an existing disposable filter element and the problem that residual water flows out of the existing filter element in the disassembly and assembly process.

In order to achieve the purpose, the present disclosure provides the following scheme:

The present disclosure provides a water purification filter element, which mainly includes:

a filter bottle;

a filter material, the filter material being detachably mounted in the filter bottle;

an end cover, the end cover being detachably mounted at one end of the filter bottle and capable of sealing the filter material in the filter bottle; and a water self-stopping and passing structure, the water self-stopping and passing structure being arranged at an another end of the filter bottle and comprising water flow channels, wherein water-stopping elastic blocks are arranged in the water flow channels respectively, and are arranged in the water flow channels via water-stopping springs respectively; when the filter element is mounted, the water-stopping elastic blocks are pressed, the water-stopping springs are contracted, and the water-stopping elastic blocks move to open the water flow channels; and when the filter element is disassembled, the water-stopping springs stretch, the water-stopping elastic blocks reset, the water flow channels are sealed by the water-stopping elastic blocks to achieve a water self-stopping effect.

In some embodiments, the end cover may be in threaded connection with the filter bottle. When the filter element is replaced, the end cover is rotated and unscrewed with respect to the filter bottle, the filter material is taken out, a new filter material is mounted according to the original direction, then, after the end cover is mounted on the filter bottle, the water purification filter element after the filter material is replaced is mounted in the water purifier or other purification equipment, and replacement of the water purification filter element is completed. According to the structure, the consumable replacement cost is reduced, resource waste is reduced, and the environment is protected.

In some embodiments, the water purification filter element further may include an annular water inlet channel for guiding and positioning, and the annular water inlet channel may be arranged at the other end of the filter bottle and can introduce a water source into the filter bottle. Whether water is introduced into the annular water inlet channel or not depends on whether the annular water inlet channel communicates with the water source of the water purifier or other equipment, for example, equipment only is provided with one stage of filter element, the annular water inlet channel of the filter element only is facilitated for the guiding and positioning of the filter element so as to complete mounting of the filter element, and water can be guided into the filter element without the annular water inlet channel. Instead, raw water can be introduced into the filter element through the water flow channels. When two or more stages of filter elements are arranged in the equipment, except for the first stage of filter element, annular water inlet channels of the other filter elements are communicated with the raw water or filtered pure water discharged by the previous stage of filter element, so that the water can be introduced into the filter element to serve as the raw water again; and the water flow channels of "the other filter elements" are used for discharging concentrated water or further filtered pure water. When the annular water inlet channel does not need to be communicated with the water source, the annular water inlet channel is sealed.

In some embodiments, the water flow channels may include a first water flow channel and a second water flow channel in which the water-stopping elastic blocks are respectively arranged via respective water-stopping springs; one of the first water flow channel and the second water flow channel is configured for discharging pure water purified by the filter material.

In some embodiments, a side wall of the filter bottle may be of a double-layer wall structure formed by an outer layer wall and an inner layer wall on which the outer layer wall is overlapped, a filter bottle water channel may be formed between the outer layer wall and the inner layer wall, and a filter bottle water distribution hole communicating with the filter bottle water channel may be formed in the inner layer wall.

The filter bottle water channel may communicate with the annular water inlet channel, and the annular water inlet channel may be configured for introducing the water source into the filter bottle water channel.

In some embodiments, the water flow channels may include a first water flow channel and a second water flow channel in which the water-stopping elastic blocks are respectively arranged via respective water-stopping springs, the second water flow channel may be an annular water flow channel and may be arranged around the periphery of the first water flow channel, and the annular water inlet channel may be arranged around the periphery of the second water flow channel; and the first water flow channel is configured for discharging pure water purified by the filter material.

Meanwhile, the present disclosure provides a household water purifier, which includes a water purifier shell and the water purification filter element, wherein the water purification filter element is detachably mounted in the water purifier shell; wherein the household water purifier further includes top sealing pieces with which c the water flow channels are sealedly butted, the top sealing pieces are fixedly mounted on an inner wall of the water purifier shell, and the top sealing pieces push the water-stopping elastic blocks in a direction close to the filter bottle while being sealedly butted with the water flow channels, so that the water flow channels can be opened.

In some embodiments, at least two stages of water purification filter elements may be arranged, and the at least two stages of water purification filter elements may be sequentially connected in series; the water purification filter element at any stage may be selected from a group consisting of a reverse osmosis filter element, an ultrafiltration filter element, an activated carbon filter element and a ceramic filter element.

In some embodiments, the water purification filter elements at all stages have the same functions, different types of filter elements can be adopted, and the functions of related filter elements can be achieved by changing the number or positions of the water self-stopping and passing structures of the bottoms of the different filter elements.

In some embodiments, the household water purifier further includes a protruded ring structure with which the annular water inlet channel is sealedly butted, the protruded ring structure may be fixed to the inner wall of the water purifier shell, a water inlet may be formed in the protruded ring structure for introducing an external water source into the annular water inlet channel.

In some embodiments, channel sealing rings may be arranged between the annular water inlet channel and the protruded ring structure to prevent water leakage.

In some embodiments, channel sealing rings may be arranged between the water flow channels and the top sealing pieces to prevent water leakage when the water flow channels and the top sealing pieces are butted.

In some embodiments, filter element mounting holes may be formed in the side wall of the water purifier shell, and sliding buckle assemblies are arranged at the filter element mounting holes; and each sliding buckle assembly may include:

a sliding buckle, a head of the sliding buckle being provided with a U-shaped buckle, and a tail of the sliding buckle being movably mounted on the side wall of the water purifier shell, wherein a limiting groove matched with the U-shaped buckle may be formed in the end cover or the filter bottle; and an elastic reset piece, the elastic reset piece being connected between the water purifier shell and the tail of the sliding buckle, wherein the sliding buckle can automatically rebound under an action of the elastic reset piece, so that the U-shaped buckle may be clamped into the limiting groove, and the water-stopping elastic block is pushed by the top sealing pieces, so that the water flow channel is automatically connected. Instead, when the water purification filter element needs to be disassembled, the sliding buckle is pushed towards the direction of compressing the elastic reset piece, the fixed effect on the filter element structure disappears, and the water-stopping spring stretches outwards, the filter element structure pops out of the water purifier shell, the water-stopping elastic block resets, the water flow channels are automatically disconnected, and the filter element structure can be directly taken out and is convenient to disassemble and assemble.

In some embodiments, the elastic reset piece may be a reset spring.

In some embodiments, the household water purifier further includes an intelligent faucet, a water inlet and outlet quality monitoring module and/or a filter element replacement reminding module, and the intelligent faucet, the water inlet and outlet quality monitoring module and/or the filter element replacement reminding module may be communicatively connected with an internal control system of the water purifier.

In some embodiments, the household water purifier further includes an intelligent faucet. The intelligent faucet may be an existing accessory, which may be connected to the internal control system of the water purifier through a circuit, can monitor the water inlet and outlet quality, can remind filter element replacement, and can also have a touch water outlet function.

The water flow channels, electrical apparatus elements and an electric control system which are required by normal work of the water purifier may be arranged in the water purifier shell, so that the normal work of the water purifier can be ensured.

Compared with the prior art, the present embodiment has the following technical effects:

The filter element is reasonable in structural design, the filter material is detachably mounted in the filter bottle, the filter material can be independently replaced through opening the end cover, so that the consumable replacement cost is reduced, and resource waste is avoided. Through arranging the water self-stopping and passing structure, the automatic water-stopping function of the filter element is achieved, the water flow channels are automatically closed when the filter element is disassembled, and in the disassembly and assembly process, residual water in the filter element is prevented from flowing out to cause machine or furniture pollution.

According to a household water purifier including the water purification filter element, due to the fact that the water purification filter element adopts the design of an annular water inlet channel, alignment is not needed in the mounting process, and the quick assembling and disassembling function of blind insertion of the filter element can be achieved. After the water purification filter element is inserted into a water purifier shell, sliding buckle assemblies are started to fix the water purification filter element in the water purifier shell, so that the water purification filter element is easy and convenient in operation to disassemble and assemble. The household water purifier not only can be quickly assembled and disassembled without alignment, but also has the function of automatic water stopping of the filter element and the function of independent replacement the filter material of the filter element, and is beneficial to improving the use experience of a user.

In addition, in another household water purifier scheme disclosed by the present disclosure, an intelligent faucet, a water inlet and outlet quality monitoring module and/or a filter element replacement reminding module are arranged, so that the water purifier has the monitoring function of water inlet and outlet quality and/or the reminding function of filter element replacement. The household water purifier has various functions, and further improves the use experience and the life convenience of the user.

BRIEF DESCRIPTION OF THE DRAWINGS

To more clearly illustrate the embodiment of the present disclosure or the technical scheme in the prior art, the following briefly introduces the attached figures to be used in the embodiment. Apparently, the attached figures in the following description show merely some embodiments of the present disclosure, and those skilled in the art may still derive other drawings from these attached figures without creative efforts.

Figure 1:
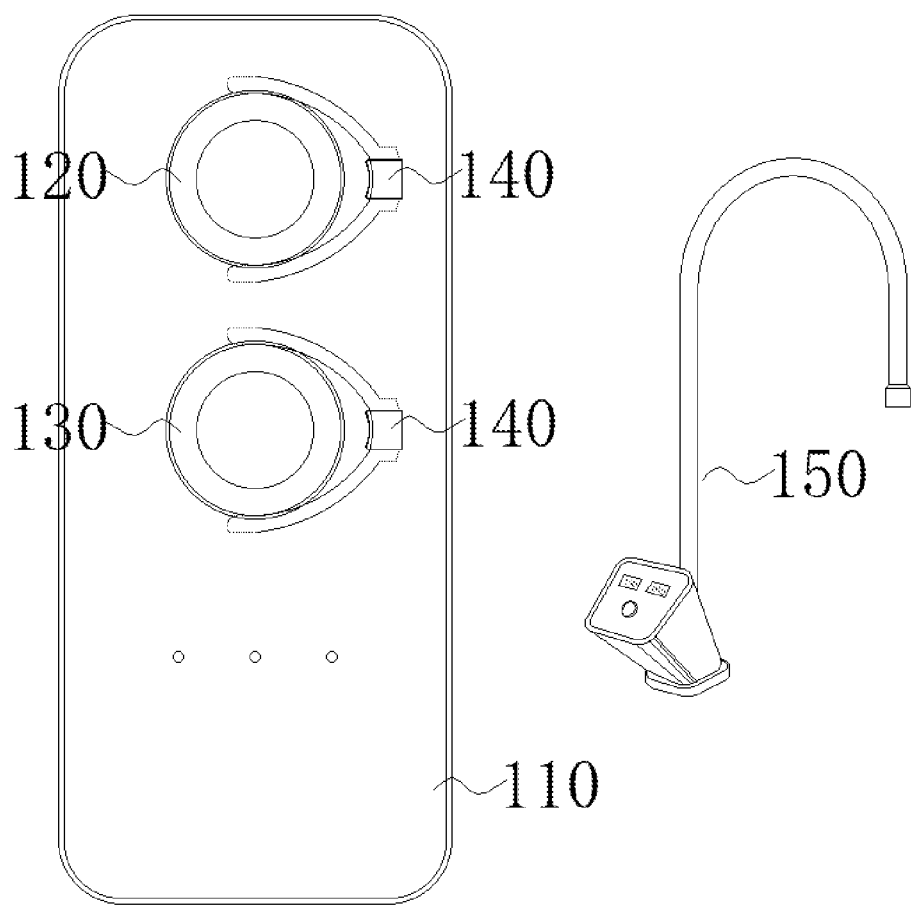
FIG. 1 is a schematic diagram of an overall structure of a household water purifier according to an embodiment of the present disclosure.

Reference numerals in the accompanying drawings: 110 water purifier shell; 120 first-stage water purification filter element; 121 water inlet direction; 122 water outlet direction; 130 second-stage water purification filter element; 131 end cover; 1311 limiting groove; 1312 end cover rubber ring; 132 filter bottle; 1321 filter bottle water distribution hole; 1322 filter bottle water channel; 1323 water-passing pipeline base; 1324 channel sealing ring; 1325 water-stopping elastic block; 1326 water-stopping spring; 133 reverse osmosis membrane filter element; 134 second-stage raw water flow direction; 135 second-stage concentrated water flow direction; 136 second-stage pure water flow direction; 140 sliding buckle; 141 sliding handle; 142 elastic reset piece; 150 intelligent faucet; 160 annular water inlet channel; 170 first water flow channel; and 180 second water flow channel.

DETAILED DESCRIPTION

The following clearly and completely describes the technical scheme in the embodiments of the present disclosure with reference to the attached figures in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

One of the purposes of the present disclosure is to provide a water purification filter element to solve the problems of resource waste and high use cost of an existing disposable filter element and the problem that residual water flows out of the existing filter element in the disassembly and assembly process.

The other of the purposes of the present disclosure is to further provide a household water purifier with the water purification filter element.

To make the foregoing objective, features and advantages of the present disclosure clearer and more comprehensible, the present disclosure is further described in detail below with reference to the attached figures and specific embodiments.

Embodiment I

Figure 2:
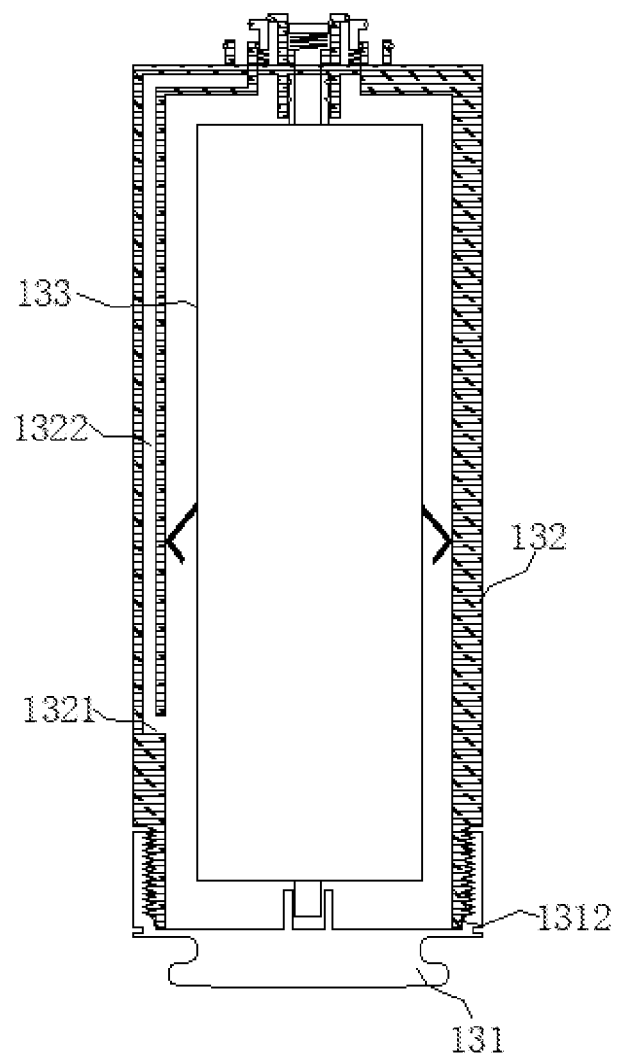
FIG. 2 is a schematic diagram of a structure of a water purification filter element according to the embodiment of the present disclosure.
Figure 3:
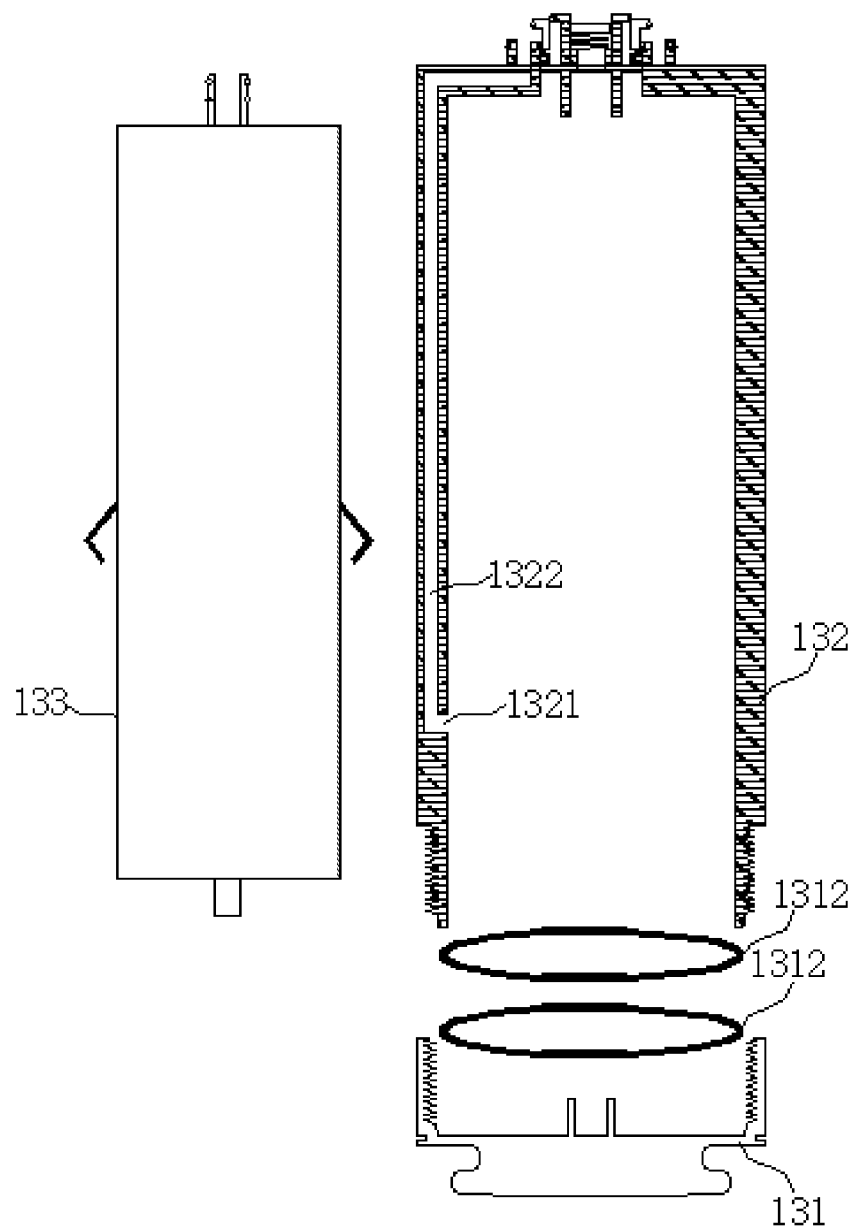
FIG. 3 is a exploded schematic diagram of the structure of the water purification filter element according to the embodiment of the present disclosure.

As shown in FIG. 2 and FIG. 3, the embodiment provides a water purification filter element mainly including a filter bottle 132, a filter material, and end cover 131, a water self-stopping and passing structure, and an annular water inlet channel with guiding and positioning functions. The filter material is detachably mounted in the filter bottle 132, and the end cover 131 is detachably mounted at one end of the filter bottle 132 and can seal the filter material in the filter bottle 132. The water self-stopping and passing structure is arranged at the other end of the filter bottle 132, and includes water flow channels and water-stopping elastic blocks 1325 arranged in the water flow channels respectively. The water-stopping elastic blocks 1325 are arranged in the water flow channels via water-stopping springs 1326 respectively. When the filter element is mounted, the water-stopping elastic blocks 1325 are pressed, the water-stopping springs 1326 are contracted, and the water-stopping elastic blocks 1325 move in a direction close to the filter bottle 132 to open the water flow channels. When the filter element is disassembled, the water-stopping springs 1326 stretch, the water-stopping elastic blocks 1325 reset, the water flow channels are sealed by the water-stopping elastic block 1325, thereby achieving the water self-stopping effect. The above-mentioned "stretch" is a verb that refers to an action of the water-stopping spring 1326 from a contracted state when the water flow channels are kept open to a state when the water-stopping springs 1326 restore the natural lengths of the springs, the water-stopping springs are lengthened from contraction to stretch in the process, and therefore, the process is called as "a stretching process". The annular water inlet channel 160 and the water self-stopping and passing structure are arranged at the same end of the filter bottle 132, and the annular water inlet channel 160 may introduce a water source into the filter bottle 132.

In the embodiment, whether water is introduced into the annular water inlet channel 160 or not depends on whether the annular water inlet channel communicates with the water source of the water purifier or other equipment, as the equipment only provided with one stage of filter element is taken as example, the annular water inlet channel of the filter element only plays guiding and positioning roles to complete mounting of the filter element, and water can be guided into the filter element without the annular water inlet channel. Instead, raw water can be introduced into the filter element through the water flow channels. When two or more stages of filter elements are arranged in the equipment, except for the first stage of filter element, annular water inlet channels of the other filter elements are communicated with the raw water or filtered pure water discharged by the previous stage of filter element, so that the water can be introduced into the filter element to serve as the raw water again; and the water flow channels of "the other filter elements" are used for discharging concentrated water or further filtered pure water.

In the embodiment, as shown in FIG. 2 and FIG. 3, the end cover 131 is in threaded connection with the filter bottle 132, when the filter element is replaced, the end cover 131 is rotated and unscrewed from the filter bottle 132, the filter material is taken out, a new filter material is mounted according to the original direction, then, after the end cover 131 is mounted on the filter bottle 132, the water purification filter element after the filter material is replaced is mounted in the water purifier or other purification equipment, and replacement of the water purification filter element is completed. According to the structure, the consumable replacement cost is reduced, resource waste is reduced, and the environment is protected.

In the embodiment, as shown in FIG. 2, FIG. 3 and FIG. 6-8, the water flow channels comprise a first water flow channel 170 and a second water flow channel 180, the water-stopping elastic blocks 1325 are arranged in respective water flow channels, and the water-stopping elastic blocks 1325 are arranged in respective water flow channels via respective water-stopping springs 1326. One of the first water flow channel 170 and the second water flow channel 180 is configured for discharging pure water purified by the filter material. Preferably, the first water flow channel 170 is a columnar water flow channel, the second water flow channel 180 is an annular water flow channel and arranged around the periphery of the first water flow channel 170, and the annular water inlet channel 160 is arranged around the periphery of the second water flow channel 180. Preferably, the first water flow channel 170, the second water flow channel 180 and the annular water inlet channel 160 form a concentric circular ring structure.

In the embodiment, the first water flow channel 170 is of a straight pipe structure, one end of the first water flow channel 170 penetrates through an end surface of the filter bottle 132 and protrudes out of the filter bottle 132, and the other end of the first water flow channel 170 is positioned in the filter bottle 132 and configured for being connected with the filter material to discharge filtered pure water. A first check ring and a second check ring are arranged around on the periphery of a protruded part of the first water flow channel 170 on an outer end surface of the filter bottle 132 in sequence, i.e., the first check ring is arranged around the periphery of the protruded part of the first water flow channel 170, the second check ring is arranged around the periphery of the first check ring. An annular channel formed between the first check ring and the protruded part of the first water flow channel 170 is the second water flow channel 180, and an annular channel between the first check ring and the second check ring is the annular water inlet channel 160. The above-mentioned structure is preferred, and in actual operation, the first water flow channel 170, the second water flow channel 180 and the annular water inlet channel 160 may be structures recessed into an interior of the filter bottle 132 or other structures which can realize the function of water inlet and outlet or opening and closing of the water flow channels.

In the embodiment, as shown in FIG. 2 and FIG. 3, a side wall of the filter bottle 132 is of a double-layer wall structure formed by an outer layer wall and an inner layer wall on which the outer layer wall overlaps, a filter bottle water channel 1322 is formed between the outer layer wall and the inner layer wall, and a filter bottle water distribution hole 1321 communicating with the filter bottle water channel 1322 is formed in the inner layer wall, and the filter bottle water channel 1322 communicates with the annular water inlet channel 160 or the second water flow channel 180, so as to introduce the water source into the filter bottle water channel 1322. The "water source" refers to water which has not passed through the filter and is to be filtered by the filter, and may be referred to as "raw water".

The filter element is reasonable in structural design, the filter material is detachably mounted in the filter bottle, the filter material can be independently replaced through opening the end cover, the consumable replacement cost is reduced, and resource waste is avoided. Further, through arranging the water self-stopping and passing structure, the automatic water-stopping function of the filter element is achieved, the water flow channels are automatically closed when the filter element is disassembled, and in the disassembly and assembly process, residual water in the filter element is prevented from flowing out to cause machine or furniture pollution. In addition, due to the fact that the water purification filter element adopts the design of an annular water inlet channel, alignment is not needed in the mounting process, and when being inserted blindly, the filter element can be assembled and disassembled quickly.

Embodiment II

As shown in FIGS. 1 to 11, the embodiment provides a novel household water purifier which mainly includes a water purifier shell 110, two stages of the water purification filter elements in the first embodiment, and an intelligent faucet 150, wherein the two stages of the water purification filter elements include a first-stage water purification filter element 120 and a second-stage water purification filter element 130. The household water purifier employs two filter elements, and filter materials of the two filter elements may be selected from a PP cotton filter element, a granular activated carbon filter element, a compressed activated carbon filter element, a sintered activated carbon filter element, a ceramic filter element, an ultrafiltration filter element, a nanofiltration filter element, a reverse osmosis filter element and combinations thereof. As a preferred embodiment, the first-stage water purification filter element 120 is the sintered activated carbon filter element, the second-stage water purification filter element 130 is the reverse osmosis filter element. In actual operation, the types and the number of the filter elements may be changed according to actual requirements, for example, a three-stage filter element or a four-stage filter element is provided, and the filter materials may be determined according to the pursuit of a user for water quality, the cost and the like.

In the household water purifier provided by the embodiment, the water flow channels, electrical apparatus elements and an electric control system which are required by normal work of the water purifier are arranged in the water purifier shell 110, so that the normal work of the water purifier can be ensured. The above devices are in the prior art and are not repeated here.

Figure 4:
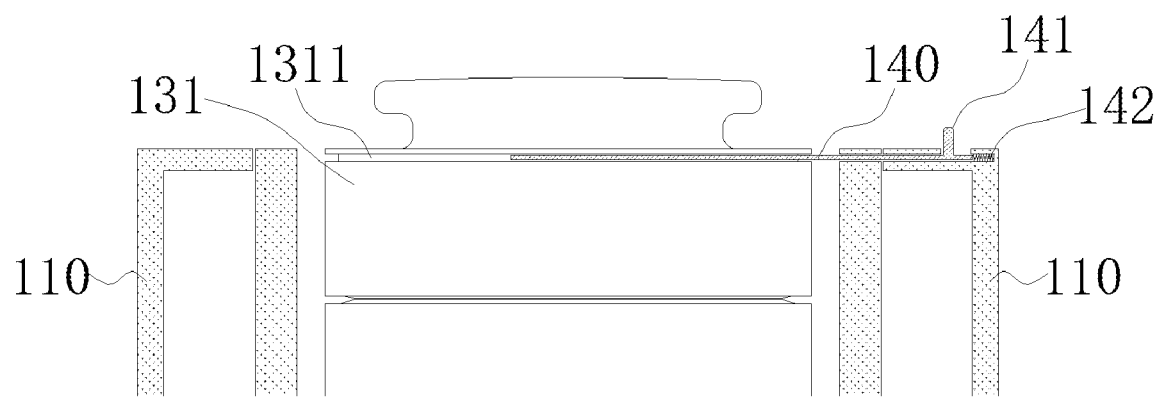
FIG. 4 is a schematic diagram of a structure of a buckle sliding block assembly according to the embodiment of the present disclosure.

In the embodiment, as shown in FIG. 4, a top end of the second-stage water purification filter element 130 is provided with a sliding buckle 140 capable of sliding leftwards and rightwards (leftwards and rightwards herein are based on the figure viewed from a particular angle and the sliding buckle 140 can slide up and down or even slide obliquely in actual operation). When the second-stage water purification filter element 130 is mounted, the sliding buckle 140 is slid rightwards, then the second-stage water purification filter element 130 is placed in the water purifier shell 110, and the force applied to the sliding buckle 140 is removed, and the sliding buckle 140 can be slid leftwards under the action of the elastic reset piece 142. The U-shaped buckle at the left end (which only refers to the direction as shown in FIG. 4, is not limited to being arranged at the left end in actual operation, the structure can be simply changed to be up and down or front and back ends or by rotating the sliding buckle to achieve the purpose of disassembling and assembling the filter element) of the sliding buckle 140 is clamped into the limiting groove 1311 in the periphery of the end cover 131; and therefore, the second-stage water purification filter element 130 is fixedly clamped in the water purifier shell 110, and the mounting of the second-stage water purification filter element 130 is completed. When the second-stage water purification filter element 130 is disassembled, the sliding buckle 140 is pulled rightwards, the U-shaped buckle is separated from the limiting groove 1311, the second-stage water purification filter element 130 is released from a fixing force and popped out of the water purifier shell 110 under the action of the water-stopping spring 1326 arranged at the bottom of the second-stage water purification filter element 130, thus the filter element can be directly taken out of the water purifier shell 110. Preferably, the elastic reset piece 142 is preferably a reset spring structure. A sliding handle 141 can be arranged at the end, away from the U-shaped buckle, of the sliding buckle 140 so as to pull the sliding buckle 140.

In the embodiment, the assembling and disassembling steps of the first-stage water purification filter element 120 and the second-stage water purification filter element 130 are consistent and are not repeated here.

In the embodiment, the bottom structure of the first-stage water purification filter element 120 and the bottom structure of the second-stage water purification filter element 130 are identical, and in use, the difference only lies in that the number and the water flow direction of end water flow channels (including the annular water inlet channel) is changed during connection, the principle and the structure are identical, and the second-stage water purification filter element 130 is described below as a representation. The first-stage water purification filter element 120 is not repeated again.

As shown in FIG. 2 and FIG. 3, the second-stage water purification filter element 130 includes an end cover 131, end cover rubber rings 1312, a filter bottle 132 and a reverse osmosis membrane filter element 133 (filter material). When in use, the reverse osmosis membrane filter element 133 is inserted into the filter bottle 132, the end cover rubber rings 1312 are placed at a corresponding position of the threaded end of the filter bottle 132, and the end cover 131 is screwed onto the filter bottle 132 through threads, therefore the second-stage water purification filter element 130 is assembled and can be placed into the water purifier shell 110 to be directly used. When the second-stage water purification filter element 130 needs to be replaced, the end cover 131 is unscrewed from the filter bottle 132, then an old filter material is directly taken out, a new filter material is placed, the end cover 131 is screwed, finally the second-stage water purification filter element 130 with the replaced filter material is placed into the water purifier shell 110, and the replacement operation of the filter element can be completed.

Figure 6:
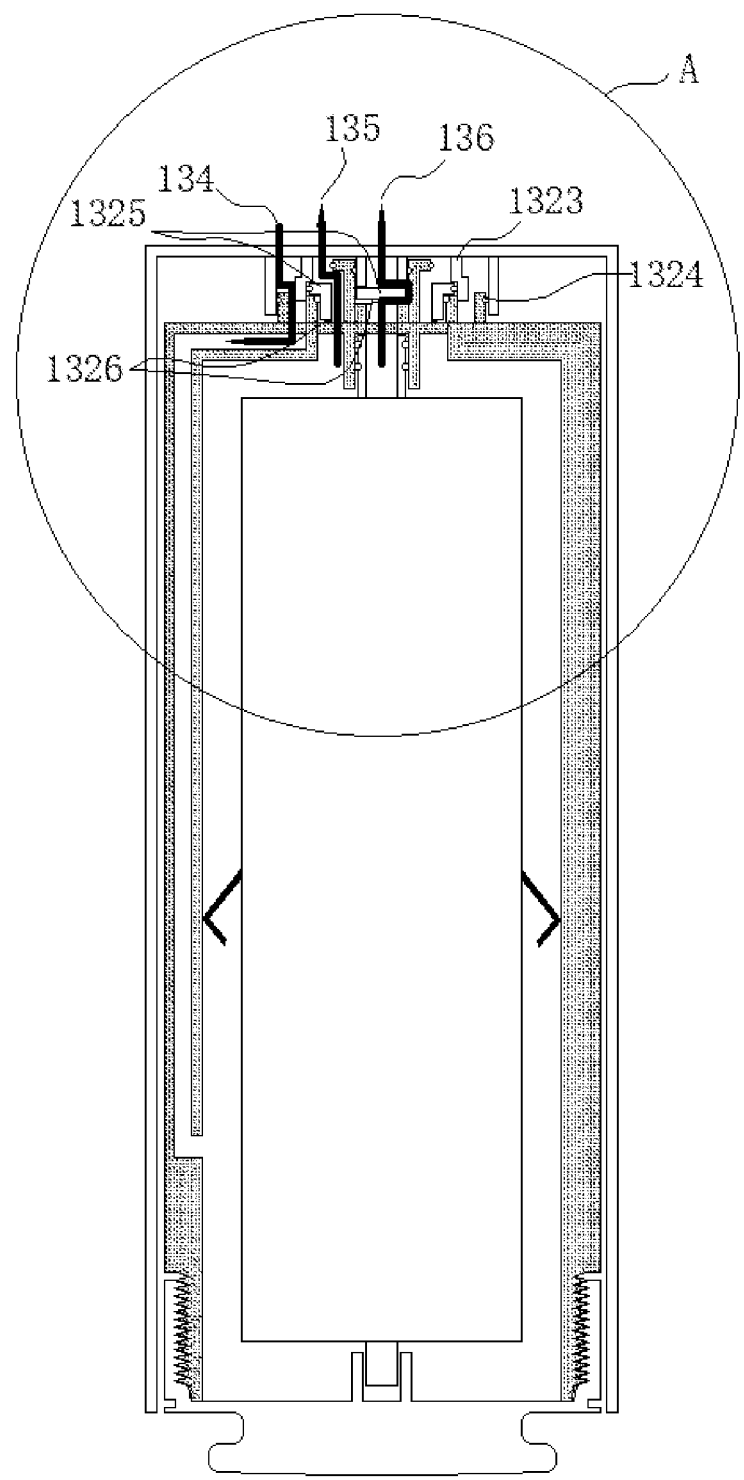
FIG. 6 is a schematic diagram of a second-stage water purification filter element in a mounting state according to the embodiment of the present disclosure.
Figure 7:
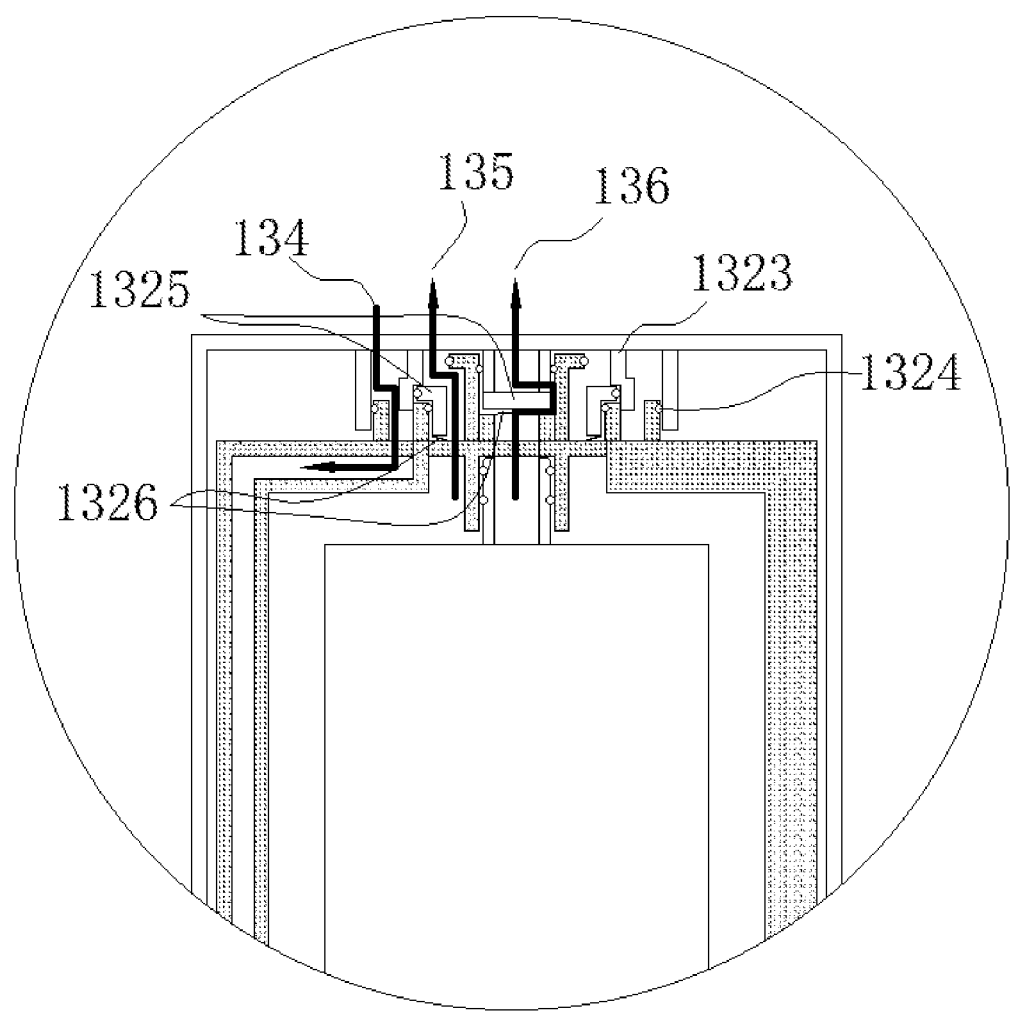
FIG. 7 is an enlarged schematic diagram of a structure of part A in FIG. 6.

As shown in FIG. 6 and FIG. 7, three water flow channels, namely the first water flow channel 170, the second water flow channel 180 and the annular water inlet channel 160, are arranged at the bottom of the second-stage water purification filter element 130. Each water flow channel is provided with a channel sealing ring 1324, and a water-stopping elastic block 1325 and a water-stopping spring 1326 are arranged in each of the first water flow channel 170 and the second water flow channel 180. In the embodiment, the arrangements and the specific structures of the first water flow channel 170, the second water flow channel 180 and the annular water inlet channel 160 are described in the first embodiment and are not repeated herein.

Figure 8:
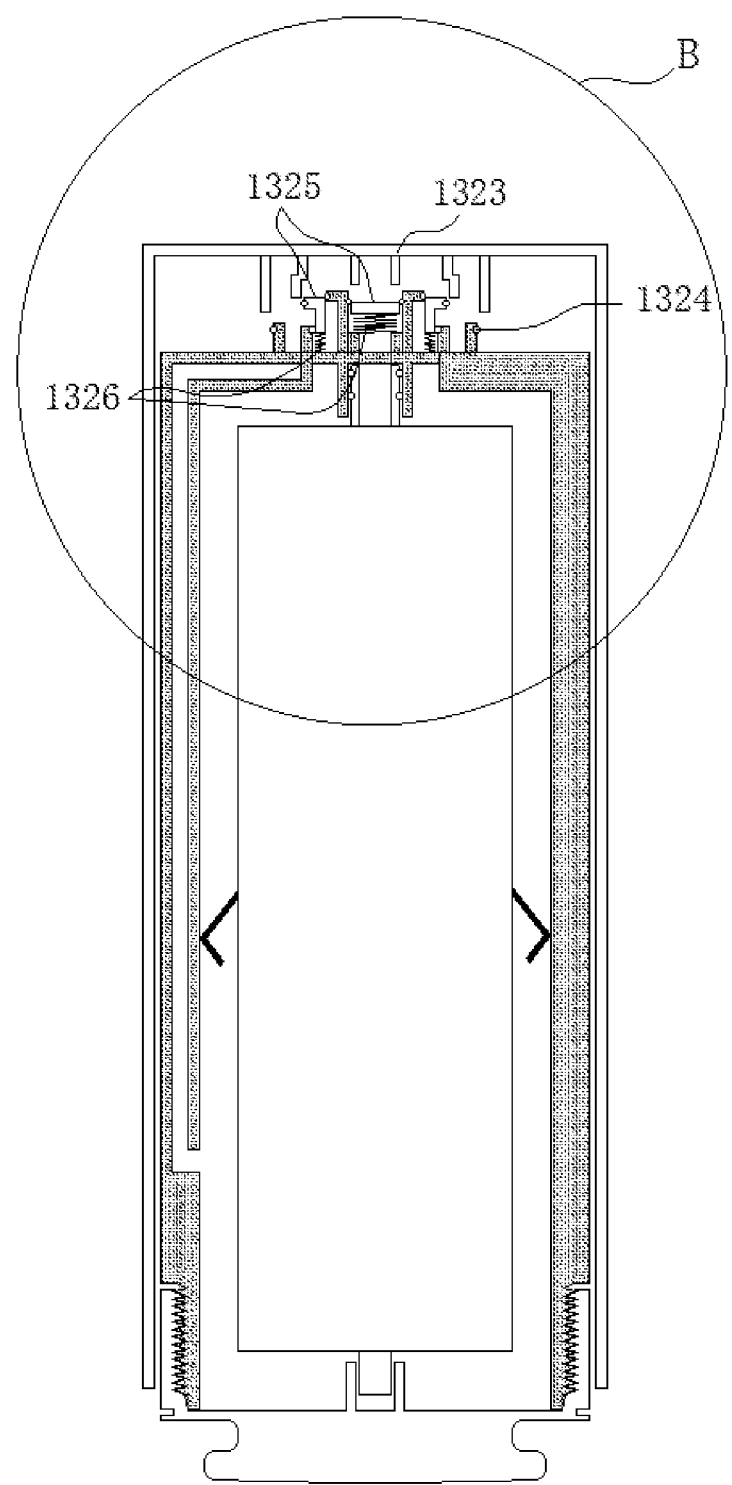
FIG. 8 is a schematic diagram of a second-stage water purification filter element in a popping state according to the embodiment of the present disclosure.
Figure 9:
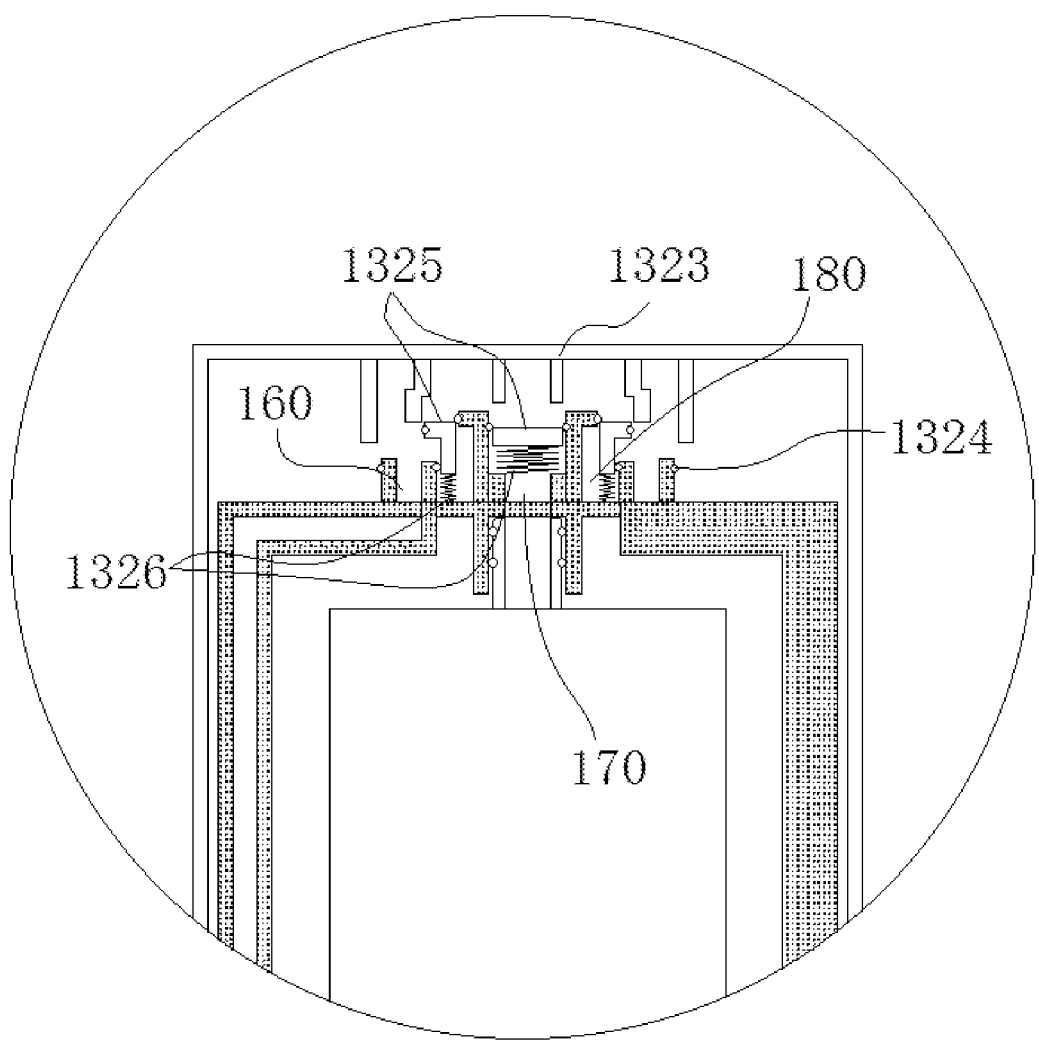
FIG. 9 is an enlarged schematic diagram of a structure of part B in FIG. 8.

As shown in FIG. 8 and FIG. 9, when the second-stage water purification filter element 130 is not used, the water-stopping spring 1326 is in a natural state, the water-stopping elastic block 1325 is pressed upwards ("upwards" is a orientation as shown in FIG. 8 and FIG. 9 and does not represent the actual orientation, and in actual operation, the water-stopping elastic block 1325 can be pressed upwards and downwards as well as leftwards and rightwards), and the water-stopping elastic block 1325 and the channel sealing rings 1324 work together to achieve a sealing effect. Due to the fact that some kinds of water purification filter elements need to be stored in a sealed mode, the design can protect the filter elements. In addition, the design can prevent water in the filter elements from leaking outwards to cause pollution and even damage to the equipment when the filter elements are disassembled.

As shown in FIG. 6 and FIG. 7, after the second-stage water purification filter element 130 is mounted in the water purifier shell 110, a water-passing pipeline base 1323 in the water purifier shell 110 is inserted into the water flow channel, and the channel sealing rings 1324 in the water flow channels and the water-passing pipeline base 1323 work together to achieve a channel sealing effect.

Figure 5:
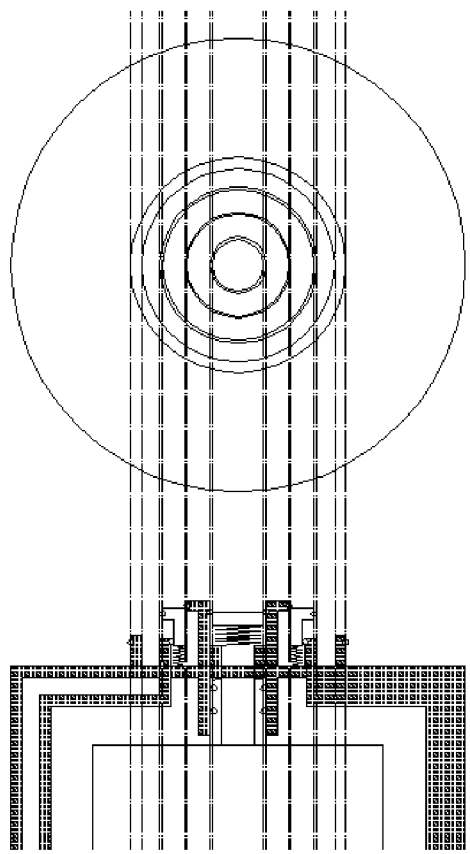
FIG. 5 is a top schematic diagram of an annular channel at a bottom of the water purification filter element according to the embodiment of the present disclosure.

As shown in FIG. 5, the water purifier shell 110, the water flow channels of the second-stage water purification filter element 130 and the shell base adopt the annular water flow channels, and when the second-stage water purification filter element 130 is mounted, the channels can be connected only by inserting the filter element into the shell without finding the direction to rotate and align, so that the machine can work normally.

Figure 10:
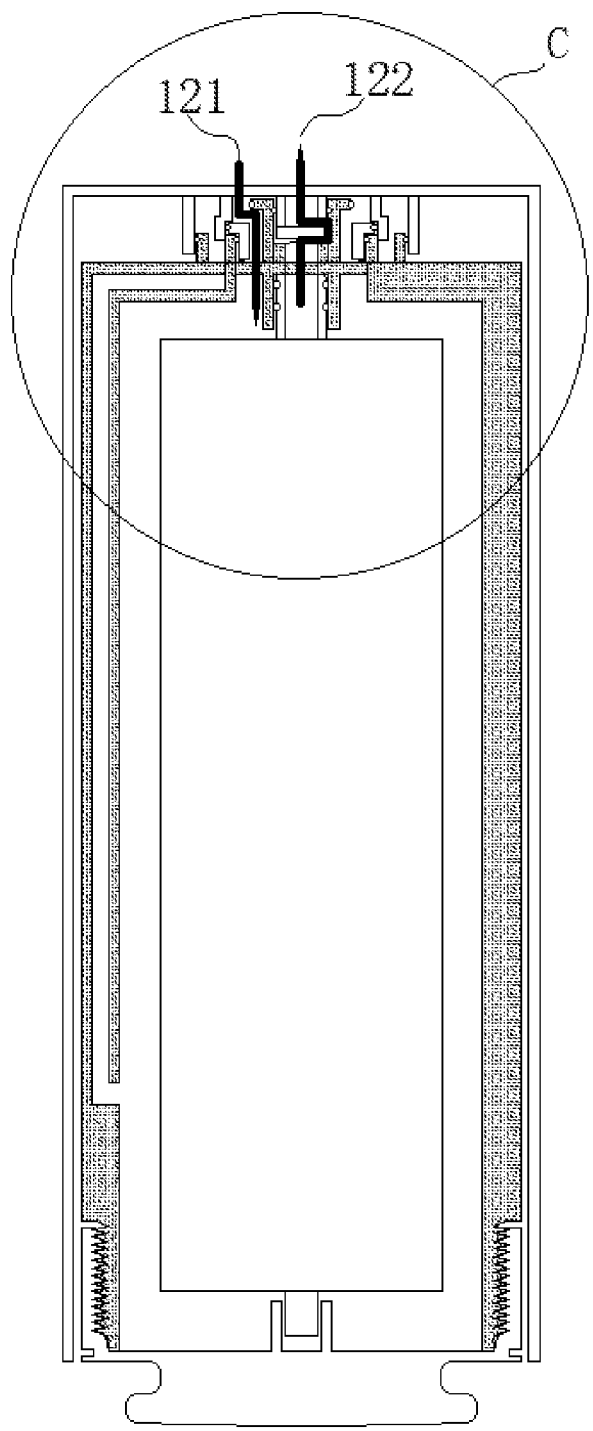
FIG. 10 is a schematic diagram of a first-stage water purification filter element in a mounting state according to the embodiment of the present disclosure.
Figure 11:
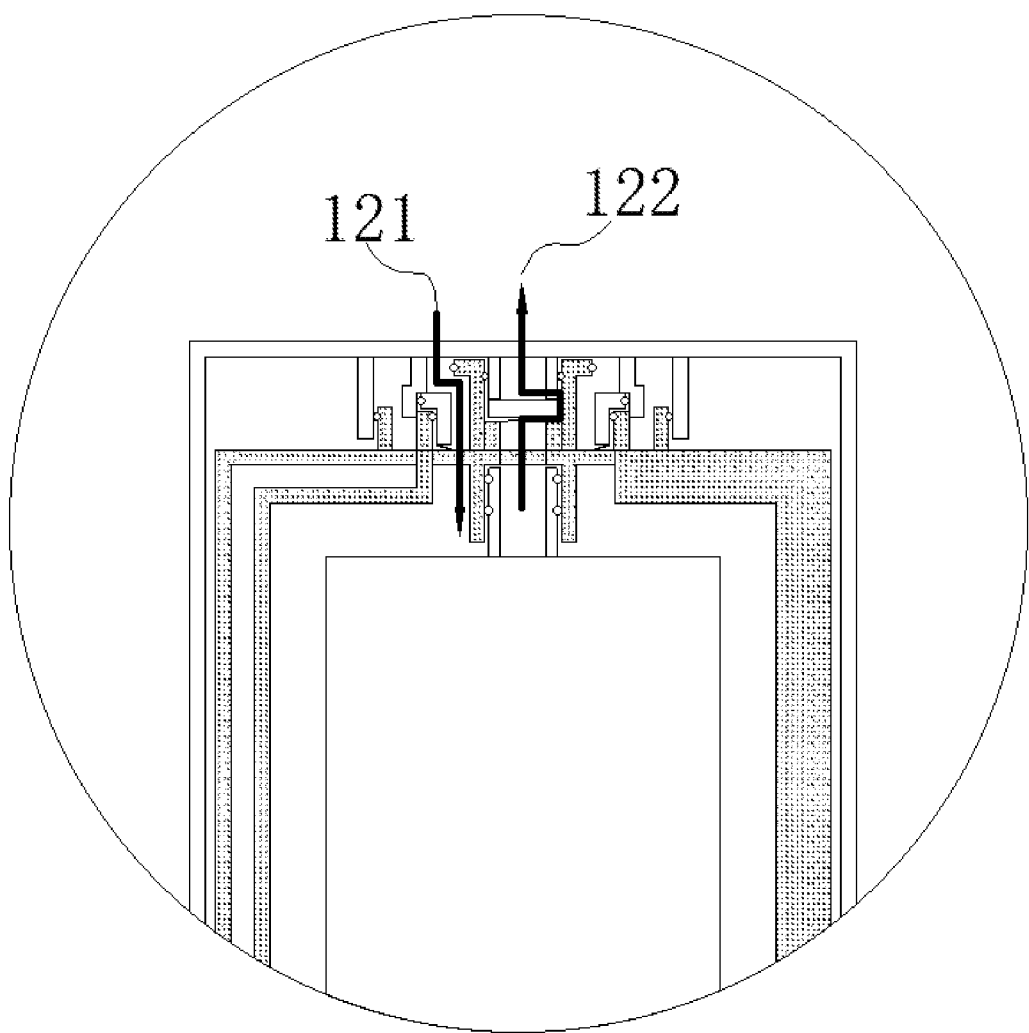
FIG. 11 is an enlarged schematic diagram of a structure of part C in FIG. 10.

As shown in FIG. 10 and FIG. 11, the bottom structure and the connector base of the first-stage water purification filter element 120 are the same as those of the second-stage water purification filter element 130, and the difference lies in that in pipeline connection, pipeline connection is carried out according to a water inlet direction 121 and a water outlet direction 122 shown in FIG. 10 and FIG. 11, other pipelines are sealed by plugs, and the first-stage water purification filter element 120 can be normally connected to work. Wherein the water inlet direction 121 of the first-stage water purification filter element 120 is a flow direction of first-stage raw water, the water outlet direction 122 of the first-stage water purification filter element 120 is a flow direction of first-stage purified water, "the first-stage raw water" refers to a water source entering the purifier for the first time, and "the first-stage purified water" refers to purified water generated and filtered by the first-stage water purification filter element 120. Correspondingly, in the subsequent water purification filter elements, namely in the second-stage, third-stage and even N-stage filter elements, the differences from the first-stage water purification filter element 120 in which only the first water flow channel 170 and the second water flow channel 180 are used lie in that the first water flow channel 170, the second water flow channel 180 and the annular water inlet channel 160 of these filter elements are used simultaneously, as shown in FIG. 7, and a second-stage raw water flow direction 134, a second-stage concentrated water flow direction 135 and a second-stage pure water flow direction 136 are respectively formed in the annular water inlet channel 160, the second water flow channel 180 and the first water flow channel 170. Wherein, "the second-stage raw water" refers to "the first-stage purified water" or is uniformly understood as the purified water of the previous stage; "the secondary concentrated water" refers to water which is not filtered by the filter material and has high impurity concentration, and is generally discharged out of the water purifier; and "the second-stage pure water" is pure water generated and filtered by the filter material, and compared with "the first-stage pure water", the second-stage pure water is higher in purification degree and better in water quality. And in this way, the filter elements at all stages are sequentially connected in series to further filter the purified water (or pure water) discharged by the filter element at the previous stage until the water quality requirement is met and the purified water is used by a user side.

In the embodiment, the intelligent faucet 150 is a known accessory, is connected to the internal control system of the water purifier through a circuit, can monitor the water inlet and outlet quality, can remind filter element replacement, and can also have a touch water outlet function. In actual operation, the water purifier can be provided with a low-configuration intelligent faucet, and a water inlet and outlet quality monitoring module, a filter element replacement reminding module, a touch water outlet module and the like which are separately arranged with the intelligent faucet are matched to achieve corresponding functions.

In the embodiment, the filter elements of the water purifier can be a reverse osmosis filter element, an ultrafiltration filter element, an activated carbon filter element, a ceramic filter element and other filter elements, the structural principle of the filter elements is identical, and different filter elements can play a role by changing the number or positions of water channels at the bottom of the filter element.

In the embodiment, the water purifier shell 110 includes a water purification pipeline, an electric control system and other household water purification technologies, and can also include a household reverse osmosis water purification technology and the like.

According to the household water purifier in the embodiment, the design of an annular channels are adopted, the direction does not need to be aligned during installation, the filter element can be directly inserted into the water purifier shell, and the channels are automatically communicated with. Meanwhile, a water self-stopping structure is further provided, the filter element is inserted into the water purifier, the channels are automatically communicated with. After the filter element is removed, the water flow channels in the filter element are automatically closed, and water in the filter element does not continuously flow out, so that the equipment is protected. In addition, the filter element is of a quick-assembling and quick-disassembling buckle structure, the filter element is mounted in the water purifier shell to be automatically locked, after the filter element is mounted, the buckle is pulled to be unlocked, the filter element automatically pops up, and the filter element is convenient to use. And finally, the filter element adopts a consumable replaceable structure, and internal filter consumables can be replaced through unscrewing the end cover of the filter element, so that the maintenance cost of the user is greatly reduced.

It should be noted that the structural arrangement of the water purifier in the embodiment is not limited to household use, and the water purifier can also be applied to other industrial equipment.

Specific examples are used for illustration of the principles and implementation methods of the present disclosure. The description of the above-mentioned embodiments is used to help illustrate the method and its core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

What is claimed is:
1. A water purification filter element, comprising:
a filter bottle;
a filter material detachably mounted in the filter bottle;
an end cover detachably mounted at one end of the filter bottle and capable of sealing the filter material in the filter bottle;
a water self-stopping and passing structure arranged at an another end of the filter bottle and including a plurality of water flow channels; and
an annular water inlet channel for guiding and positioning, the annular water inlet channel arranged at the another end of the filter bottle and capable of introducing a water source into the filter bottle;
wherein a plurality of water-stopping elastic blocks are arranged in the plurality of water flow channels respectively, and are arranged in the plurality of water flow channels via a plurality of water-stopping springs respectively;
wherein, when the filter element is mounted, the plurality of water-stopping elastic blocks are pressed, the plurality of water-stopping springs are contracted, and the plurality of water-stopping elastic blocks move to open the plurality of water flow channels;
wherein, when the filter element is disassembled, the plurality of water-stopping springs stretch, the plurality of water-stopping elastic blocks reset, and the plurality of water flow channels are sealed by the plurality of water-stopping elastic blocks to achieve a water self-stopping effect;

wherein:
- a side wall of the filter bottle is a double-layer wall structure including an outer layer wall and an inner layer wall on which the outer layer wall is overlapped;
- a filter bottle water channel is formed between the outer layer wall and the inner layer wall;
- a filter bottle water distribution hole communicating with the filter bottle water channel is formed in the inner layer wall;
- the filter bottle water channel communicates with the annular water inlet channel; and
- the annular water inlet channel is configured for introducing the water source into the filter bottle water channel.

2. The water purification filter element according to claim 1, wherein:
- the plurality of water flow channels includes a first water flow channel and a second water flow channel in which the plurality of water-stopping elastic blocks are respectively arranged via respective water-stopping springs; and
- one of the first water flow channel and the second water flow channel is configured for discharging pure water purified by the filter material.

3. The water purification filter element according to claim 1, wherein:
- the plurality of water flow channels includes a first water flow channel and a second water flow channel in which the plurality of water-stopping elastic blocks are respectively arranged via respective water-stopping springs;
- the second water flow channel is an annular water flow channel and arranged around a periphery of the first water flow channel;
- the annular water inlet channel is arranged around a periphery of the second water flow channel; and
- the first water flow channel is configured for discharging pure water purified by the filter material.

4. A household water purifier, comprising a water purifier shell and a water purification filter element, wherein:
- the water purification filter element is detachably mounted in the water purifier shell;
- the water purification filter element includes:
  - a filter bottle;
  - a filter material detachably mounted in the filter bottle;
  - an end cover detachably mounted at one end of the filter bottle and capable of sealing the filter material in the filter bottle;
  - a water self-stopping and passing structure arranged at an another end of the filter bottle and including a plurality of water flow channels;
  - a plurality of water-stopping elastic blocks arranged in the plurality of water flow channels respectively, and arranged in the plurality of water flow channels via a plurality of water-stopping springs respectively; and
  - an annular water inlet channel for guiding and positioning, the annular water inlet channel arranged at the another end of the filter bottle and is capable of introducing a water source into the filter bottle;
- when the filter element is mounted, the plurality of water-stopping elastic blocks are pressed, the plurality of water-stopping springs are contracted, and the plurality of water-stopping elastic blocks move to open the plurality of water flow channels;
- when the filter element is disassembled, the plurality of water-stopping springs stretch, the plurality of water-stopping elastic blocks reset, and the plurality of water flow channels are sealed via the plurality of water-stopping elastic blocks to achieve a water self-stopping effect;
- a plurality of top sealing pieces sealedly abut the plurality of water flow channels, are fixedly mounted on an inner wall of the water purifier shell, and push the plurality of water-stopping elastic blocks in a direction close to the filter bottle while being sealedly butted with the plurality of water flow channels such that the plurality of water flow channels are opened;
- a side wall of the filter bottle is a double-layer wall structure including an outer layer wall and an inner layer wall on which the outer layer wall is overlapped;
- a filter bottle water channel is formed between the outer layer wall and the inner layer wall;
- a filter bottle water distribution hole communicating with the filter bottle water channel is formed in the inner layer wall;
- the filter bottle water channel communicates with the annular water inlet channel; and
- the annular water inlet channel is configured for introducing the water source into the filter bottle water channel.

5. The household water purifier according to claim 4, further comprising at least two stages of water purification filter elements including the water purification filter element, wherein:
- the at least two stages of water purification filter elements are sequentially connected in series; and
- each of the at least two stages of water purification filter elements is selected from a group including a reverse osmosis filter element, an ultrafiltration filter element, an activated carbon filter element, and a ceramic filter element.

6. The household water purifier according to claim 4, further comprising a protruded ring structure with which the annular water inlet channel is sealedly butted, wherein:
- the protruded ring structure is fixed to the inner wall of the water purifier shell; and
- a water inlet is formed in the protruded ring structure for introducing an external water source into the annular water inlet channel.

7. The household water purifier according to claim 4, wherein:
- a plurality of filter element mounting holes are formed in a side wall of the water purifier shell;
- a plurality of sliding buckle assemblies are arranged at the plurality of filter element mounting holes;
- the plurality of sliding buckle assemblies each include:
  - a sliding buckle, a head of the sliding buckle including a U-shaped buckle, and a tail of the sliding buckle movably mounted on the side wall of the water purifier shell; and
  - an elastic reset piece connected between the water purifier shell and the tail of the sliding buckle;
- a limiting groove matched with the U-shaped buckle is disposed in one of the end cover and the filter bottle; and
- the sliding buckle is automatically rebounded under an action of the elastic reset piece, such that the U-shaped buckle is clamped into the limiting groove, and at least one of the plurality of water-stopping elastic blocks is pushed by at least one of the plurality of top sealing pieces.

8. The household water purifier according to claim 4, further comprising at least one of an intelligent faucet, a water inlet and outlet quality monitoring module, and a filter element replacement reminding module, wherein the at least one of the intelligent faucet, the water inlet and outlet quality monitoring module, and the filter element replacement reminding module are communicatively connected with an internal control system of the household water purifier.

9. The water purification filter element according to claim 4, wherein:
the plurality of water flow channels includes a first water flow channel and a second water flow channel in which the plurality of water-stopping elastic blocks are respectively arranged via respective water-stopping springs; and
one of the first water flow channel and the second water flow channel is configured for discharging pure water purified via the filter material.

10. The water purification filter element according to claim 4, wherein:
the plurality of water flow channels includes a first water flow channel and a second water flow channel in which the plurality of water-stopping elastic blocks are respectively arranged via respective water-stopping springs;
the second water flow channel is an annular water flow channel and arranged around a periphery of the first water flow channel;
the annular water inlet channel is arranged around a periphery of the second water flow channel; and
the first water flow channel is configured for discharging pure water purified via the filter material.

11. The household water purifier according to claim 5, further comprising a protruded ring structure with which the annular water inlet channel is sealedly butted, wherein:
the protruded ring structure is fixed to the inner wall of the water purifier shell; and
a water inlet is formed in the protruded ring structure for introducing an external water source into the annular water inlet channel.

12. The household water purifier according to claim 5, wherein:
a plurality of filter element mounting holes are formed in a side wall of the water purifier shell;
a plurality of sliding buckle assemblies are arranged at the plurality of filter element mounting holes;
the plurality of sliding buckle assemblies each include:
a sliding buckle, a head of the sliding buckle including a U-shaped buckle, and a tail of the sliding buckle movably mounted on the side wall of the water purifier shell; and
an elastic reset piece, connected between the water purifier shell and the tail of the sliding buckle;
a limiting groove matched with the U-shaped buckle is disposed in one of the end cover and the filter bottle; and
the sliding buckle is automatically rebounded under an action of the elastic reset piece, such that the U-shaped buckle is clamped into the limiting groove, and at least one of the plurality of water-stopping elastic blocks is pushed by at least one of the plurality of top sealing pieces.

13. The household water purifier according to claim 5, further comprising at least one of an intelligent faucet, a water inlet and outlet quality monitoring module, and a filter element replacement reminding module, wherein the at least one of the intelligent faucet, the water inlet and outlet quality monitoring module, and the filter element replacement reminding module are communicatively connected with an internal control system of the household water purifier.

\* \* \* \* \*